United States Patent Office 2,862,963
Patented Dec. 2, 1958

2,862,963

PROCESS OF PURIFYING TEREPHTHALIC ACID

Otto Fuchs, Hofheim (Taunus), and Helmut Jockusch, Bad Soden (Taunus), Germany, assignors to Farbwerke Hoechst Aktiengesellschaft vormals Meister Lucius & Brüning, Frankfurt am Main Hochst, Germany, a company of Germany No Drawing. Application May 29, 1956
Serial No. 587,970

8 Claims. (Cl. 260—525)

Toluic acids are soluble in many organic liquids, but terephathalic acid is distinguished by its profound insolubility. It would, therefore, be expected that a mixture of these two types of acids could be split up into its two components by extraction with a suitable liquid. This is true in the case of a mechanical mixture of these acids, but not in the case of a mixture of the acids obtained, for example, by acidifying an aqueous solution of the alkali metal salts of the two types of acids. For example, when a mixture of equal parts of paratoluic acid and terephthalic acid prepared by the latter method is used, the toluic acid can only partly be removed by extraction, for example, with para-xylene which is able to dissolve para-toluic acid at the boiling point of the para-xylene. The insoluble acid so obtained always contains about 8–10% of toluic acid, and this proportion cannot be decreased even by extracting for several hours. Mixtures of these acids obtained in the manufacture of terephthalic acid from para-xylene behave similarly, so that pure terephthalic acid cannot be isolated in this manner.

The present invention is based on the observation that terephathalic acid can be separated from mixtures thereof with one or more toluic acids by suspending the mixture of acids in a liquid medium consisting of one or more alcohols containing at most 6 carbon atoms, advantageously at most 4 carbon atoms, and saturating the mixture at an elevated temperature with gaseous ammonia. The ammonium toluate formed is dissolved, whereas the ammonium terephthalate remains undissolved. This is unexpected, since it has not been possible hitherto to separate these acids from one another by utilising their different solubilities. The undissolved ammonium terephthalate can be separated in known manner from the solution containing the ammonium toluate.

In this manner it is possible to purify crude terephthalic acid obtained by the oxidation of aromatic hydrocarbons, for example, xylene, in the liquid phase with oxygen or a gas containing oxygen. The crude terephthalic acid so obtained contains, in addition to toluic acid, other impurities that cannot be removed by extraction with hot xylene or other solvents for toluic acid. These further impurities are principally salts of heavy metals which are added as oxidation catalysts, for example, cobalt salts, and resin-like dark-coloured by-products of the reaction, which are probably formed by condenstaion reactions in which aldehydes formed as intermediate products of the oxidation take part. These impurities are present in a finely subdivided form in the ammonium terephthalate not dissolved by the alcohol, but they remain undissolved when the ammonium salt is dissolved in water and can then be removed by filtration. Pure white terephthalic acid is obtained from the filtrate by acidification.

The process of the invention is advantageously carried out at a temperature not exceeding 130° C. When low boiling alcohols are used the reaction mixture may be heated at the boil. Alternatively, the mixture may be heated to about 130° C., advantageously to about 120° C., with application of pressure. When higher boiling alcohols are used it is of advantage to work below the boiling point, advantageously within the range of about 60° to about 120° C., however, in some cases lower or higher temperatures may be used. The process can also be applied to terephthalic acid containing a mixture of isomeric toluic acids, instead of a single toluic acid.

As alcohols suitable for preparing the reaction mixture there may be mentioned, in addition to methanol, other primary, secondary or tertiary alcohols alone or mixtures thereof, such as ethyl alcohol, propyl alcohol, butyl alcohol, isobutyl alcohol, secondary butanol, tertiary butanol, amyl alcohols, hexanols, ethylene glycol, propane-diols, butane-diols, pentane-diols, hexane-diols or glycerin, said alcohols containing at most 3 hydroxyl groups. There may also be used a mixture of one or more of the said alcohols with at most the same weight of an aliphatic ketone, advantageously one containing 3–6 carbon atoms, such as acetone, methyl ethyl ketone, di-isopropyl ketone or methyl isobutyl ketone, and/or of an aromatic hydrocarbon, such as benzene, toluene, ethyl-benzene or xylene, or a simple derivative thereof which is liquid under the reaction conditions and inert towards the reactants, for example, monohalogenated aromatic hydrocarbons, such as chlorobenzene, bromobenzene or chlorotoluene, and/or of an araliphatic alcohol such as methylbenzyl alcohol or benzyl alcohol.

The terephthalic acid can be obtained from its undissolved ammonium salt by dissolving the salt in water and precipitation with acid, for example, with hydrochloric acid. When absolutely anhydrous conditions must be used, as is necessary for some purposes, the ammonium salt may be suspended, for example, in boiling methanol, and decomposed into terephthalic acid and an ammonium salt by adding an anhydrous acid which is stronger than terephthalic acid and of which the ammonium salt is soluble in the solvent used. For example, there may be introduced a hydrogen halide, for example, hydrogen chloride or hydrogen bromide, or nitric acid of 100 percent strength or a chlorinated acetic acid may be added. As the terephthalic acid is insoluble in alcohols, for example, methanol, and the ammonium salts, especially the nitrate, are soluble therein, terephthalic acid is obtained directly in an anhydrous and pure condition.

The solution which remains after the separation of the undissolved ammonium terephthalate can be used repeatedly in the process until it contains up to about 70 percent of ammonium toluate. If more than that concentration of ammonium toluate is allowed to accumulate in the solvent, the degree of purity of the terephthalic acid obtained is reduced. When the solution contains up to 70 percent of ammonium toluate, it may be cooled to a temperature of, for example, −30° C., to precipitate the greater part of the dissolved ammonium toluate and residual ammonium terephthalate, and, after separating the precipitated salts, the liquid can be re-used without preliminary distillation.

The process of the invention can easily be carried out in a continuous manner, for example, as follows: Into a mixing vessel there are continuously introduced the mixture of acids to be treated, the suspending medium, for example, methanol, and ammonia. The mixture is pumped through a heated tube, while simultaneously introducing further ammonia gas. At the end of the reaction tube the liquid and the solid material are separated from each other by known methods, for example, with the aid of a bowl-type centrifuge. The liquid, if desired, after passing through a low cooling device, is returned to the mixing vessel. The solid material is passed into a second mixing vessel in which the ammonium terephthalate is dissolved in at least one solvent therefor, for example, water, or is suspended in at least one suspending medium, for example, methanol, advantageously while stirring. The solution, advantageously after removing any undissolved material therefrom, or the suspension is introduced into a second heated tube, and an acid, which is stronger than terephthalic acid, preferably hydrogen chloride gas, is simultaneously added. After leaving the tube, pure terephthalic acid is separated from the liquid phase by known methods, for example, with the aid of a second bowl-type centrifuge. The liquid is returned to the second mixing vessel, if required, after being passed through a low cooling device.

The following examples illustrate the invention:

Example 1

100 grams of a mixture consisting of 86 grams of terephthalic acid and 14 grams of para-toluic acid, and obtained by joint precipitation of the acids from an aqueous solution of their alkali metal salts, are suspended in 4 litres of methanol. Ammonia gas is then introduced at room temperature, while stirring, the gas being at first energetically absorbed. When the absorption of the ammonia diminishes, the quantity of the gas being introduced is correspondingly decreased. The mixture is heated for 3 hours at 65° C., then cooled and filtered. The filter residue is washed with methanol, then dissolved in water, and the aqueous solution is acidified with hydrochloric acid. There are obtained 84 grams of terephthalic acid of 99 percent strength, and this quantity is almost equal to the quantity of terephthalic acid used as starting material. A further 1.7 grams of terephthalic acid are contained in the filtrate. By using double the quantity of methanol, 82 grams of terephthalic acid of 100 percent strength are obtained, the other conditions being the same.

Example 2

100 grams of a mixture consisting of 95 grams of terephthalic acid and 5 grams of para-toluic acid are treated in the manner described in Example 1, except that, owing to the smaller proportion of toluic acid, only 1 litre of methanol is needed to obtain terephthalic acid of 100 percent strength. The terephthalic acid is obtained in so pure a state that, after being dried, it can be used without further treatment for the preparation of starting materials for the manufacture of artificial fibres.

Example 3

20 grams of a mixture consisting of 11.3 percent of para-toluic acid and 88.7 percent of terephthalic acid are treated with ammonia in the manner described in Example 1 in a mixture of 500 cc. of methanol and 250 cc. of acetone. There are obtained 16.6 grams of a mixture of acids containing only 1.1 percent of toluic acid in addition to the terephthalic acid.

Example 4

Instead of the mixture of methanol and acetone mentioned in Example 3, there is used a mixture consisting of 550 cc. of methanol and 160 cc. of benzene, the other conditions being the same. There are obtained 16.9 grams of terephthalic acid of 98.4 percent strength.

Example 5

From 20 grams of the initial mixture of acids mentioned in Example 3, and with the use of 550 cc. of ethylene glycol and 240 cc. of methyl ethyl ketone as suspension medium, under otherwise identical conditions, terephthalic acid of 99.7 percent strength is obtained. The high degree of purity is obtained at the expense of a reduction in yield amounting to only 8.2 grams.

The content of terephthalic acid cannot be accurately determined by dissolving the acids in a given amount of sodium hydroxide solution and back-titrating with hydrochloric acid. In the present examples the content of terephthalic acid was, therefore, determined by the following method: The mixture of acids to be analyzed is dissolved in 15 times its weight of pyridine. The solution is diluted with about 6 times its weight of water, and the mixture is then titrated with sodium hydroxide solution with the use of phenolphthalein as indicator.

Example 6

250 grams of a brown crude terephthalic acid having an acid number of 607, obtained by the oxidation of xylene, and corresponding to about 74 percent of terephthalic acid, are suspended in 2 litres of methanol and gaseous ammonia is introduced until the spontaneous liberation of heat subsidies. The mixture is then heated for about one hour at the boil, filtered, and the filter residue is washed with methanol and dissolved in water. The aqueous solution is then filtered, and a dark-brown slimy residue remains on the filter. By acidifying the filtrate 195 grams of terephthalic acid having an acid number of 673 (=99 percent) precipitate. The acid is white. The yield corresponds substantially to 100 percent of the quantity of terephthalic acid used as starting material, of which the calculated percentage data is somewhat too low owing to the presence of neutral material in the starting material.

Example 7

50 parts by weight of crude brown terephthalic acid, obtained by the oxidation of xylene with oxygen and containing 78 percent of terephthalic acid, are suspended in a mixture consisting of 1600 parts by volume of methanol and 400 parts by volume of acetone. Gaseous ammonia is introduced, while heating and stirring, until the mixture is saturated. The mixture is filtered while hot, the filter residue is dissolved in water, and the solution is filtered. A brown filter residue is obtained. On acidifying the filtrate 39 grams of terephthalic acid having an acid number of 676(=100 percent) precipitate. This acid is completely colourless, as also is an alkaline solution thereof.

We claim:

1. In a process for separating terephthalic acid from a mixture containing terephthalic acid and toluic acid, the improvement which comprises suspending said mixture in a substantially anhydrous liquid medium composed essentially of an alcohol containing up to four carbon atoms and up to three hydroxyl groups, saturating the suspension with ammonia at an elevated temperature up to about 130° C., and separating undissolved ammonium terephthalate from the saturated suspension.

2. A process as defined in claim 1 wherein the liquid medium includes up to 50% by weight of an aliphatic ketone containing from three to six carbon atoms.

3. A process as defined in claim 1 wherein the liquid medium includes up to 50% by weight of a mononuclear aromatic hydrocarbon.

4. A process as defined in claim 1 wherein alcohols containing up to four carbon atoms and up to two hydroxyl groups are used as suspending medium.

5. A process as defined in claim 1 wherein the suspension is saturated with ammonia at a temperature within the range of about 60 to 120° C.

6. A process as defined in claim 1 wherein the undissolved ammonium terephthalate separated from the saturated suspension is dissolved in an aqueous solution and, after separation of any undissolved matter therefrom, said aqueous solution is acidified for precipitating terephthalic acid.

7. A process for separating terephthalic acid in enhanced yields of high purity from crude terephthalic acid containing toluic acid, oxidation catalyst and by-product condensation residues which comprises suspending the crude terephthalic acid in a substantially anhydrous liquid medium composed essentially of an alcohol containing up to four carbon atoms and up to three hydroxyl groups, saturating the suspension at an elevated temperature up to about 130° C. with ammonia, separating undissolved solid from the saturated suspension, suspending the undissolved solid in boiling methanol, acidifying with an anhydrous mineral acid, and recovering anhydrous terephthalic acid.

8. A process for separating terephthalic acid in enhanced yields of high purity from crude terephthalic acid containing toluic acid, oxidation catalyst and by-product condensation residues which comprises suspending, in a first stage, the crude terephthalic acid in a substantially anhydrous liquid medium composed essentially of an alcohol containing up to four carbon atoms and up to three hydroxyl groups, saturating the suspension at a temperature within the range of about 60 to 120° C. with ammonia, separating undissolved solid from the saturated suspending medium, recycling the separated suspending medium to the first stage, dissolving the undissolved ammonium terephthalate separated from said suspension in an aqueous solution and, after separation of any undissolved matter therefrom, acidifying said aqueous solution for precipitating terephthalic acid.

References Cited in the file of this patent

UNITED STATES PATENTS

| | | |
|---|---|---|
| 2,636,899 | Burrows et al. | Apr. 28, 1953 |
| 2,732,399 | Carlston et al. | Jan. 24, 1956 |
| 2,741,633 | McKinnis et al. | Apr. 10, 1956 |
| 2,746,990 | Fortuin et al. | May 22, 1956 |

OTHER REFERENCES

Heilbron: Dictionary of Organic Compounds, IV, p. 520 (1953).